Jan. 30, 1968  H. E. R. GRUNER  3,366,007
NADIR POINT INDICATING OPTICAL DEVICE FOR
PHOTOGRAMMETRIC PROJECTION PLOTTER
Filed Oct. 31, 1966

HEINZ E. R. GRUNER
INVENTOR.

BY Frank C. Parker

ATTORNEY 3,366,007
NADIR POINT INDICATING OPTICAL DEVICE FOR PHOTOGRAMMETRIC PROJECTION PLOTTER
Heinz E. R. Gruner, Irondequoit, N.Y., assignor to Bausch & Lomb Incorporated, Rochester, N.Y., a corporation of New York
Filed Oct. 31, 1966, Ser. No. 590,955
4 Claims. (Cl. 88—24)

The present invention relates to an optical nadir point indicator for use in a photogrammetric projection plotter or the like and more particularly relates to an optical indicating device which is moved in contact with the mapping surface of said plotter.

In photogrammetric practice, wherein aerial photographs are transformed into maps by direct projection plotters, there is a need to recover the nadir point, i.e., the location of the point on the mapping surface which represents the foot of a perpendicular which is dropped from the point of exposure in midair to the terrain. In modern practice, said nadir point must be carefully located on the mapping surface to facilitate accurate geometry in the alignment of consecutive photographs or alignment of the projectors themselves for the evaluation of a series of photographs taken during the photographic flight.

Where direct projection mapping apparatus is used, the aerial photograph is projected upon a horizontal mapping surface. Among the infinite number of pencils of light rays which form the image of terarin details, there is one pencil of rays emanating from the external node of the projection lens which stands normal to the plane of the mapping surface and forms an image which identifies the nadir point. It is desirable in such apparatus that some non-contacting optical device be provided to indicate the position of said nadir point on the mapping surface with reasonable precision.

It is an object of the present invention to provide a novel optical device for indicating the geometrical position of the above-mentioned nadir point by non-contact means which is simple in structure and easy to use.

It is a further object to provide such a device which is quickly arranged in operative condition and is accurate and reliable in locating the nadir point.

Further objects and advantages of the present invention will be found in details of construction and arrangement of parts thereof, a full disclosure of which is given in the specification herebelow taken together with the accompanying drawing, wherein.

Figure 1:
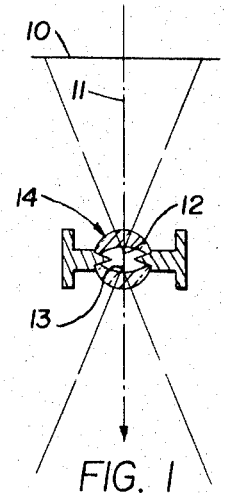
FIG. 1 is a semi-diagrammatic view showing a projector lens in relation to a photographic area to be projected.

A typical direction projection photogrammetric apparatus as partially shown in FIG. 1 comprises a phototransparency 10 which is aligned on a projection axis 11 extending through the nodal points 12, 13 of a projection lens 14.

Figure 2:
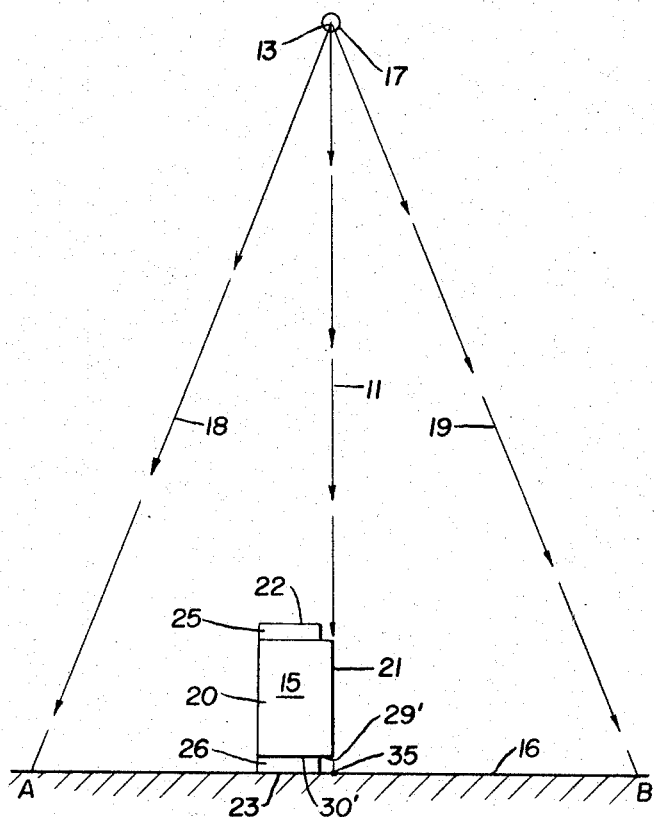
FIG. 2 is a diagrammatic view showing the essential parts of the present invention.

The indicating optical device is shown diagrammatically in operating position in FIG. 2, where said device is indicated generally by numeral 15 as a clear glass block resting on a mapping surface 16.

Since by optical definition, the lower nodal point 13 of a lens is the geometrical locus at which all image rays seem to originate, this point may be considered to be a point light source 17 for purposes of demonstrating this invention. Light source 17 emits light rays in all directions equally. One selected light ray travels downwardly along the vertical axis 11 to the horizontal mapping surface 16 and therefore stands normal thereto. A fan of rays, all of which are contained in a single plane including the aforementioned normal ray, also stands normal upon the mapping surface and its trace on the mapping surface 16 is a straight line.

Rays 18 and 19 diverging from the point light source 17 constitute the boundary rays of one of an infinite number of vertical fans of rays and line A–B is their trace on the mapping surface 16.

Figure 3:
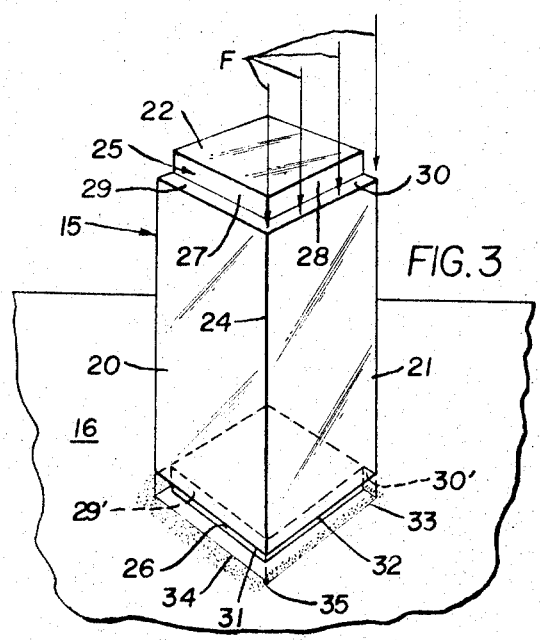
FIG. 3 is a perspective view showing a preferred form of an operating member of said invention.
Figure 4:
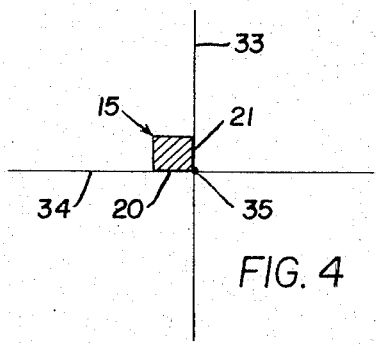
FIG. 4 is a diagram which is explanatory of said invention.

According to the present invention, the novel optical device 15, as shown per se in FIG. 3, is provided with two vertical optically flat surfaces 20, 21 which form right angles with each other. At the top and bottom thereof plano surfaces 22 and 23 are provided normal to surfaces 20, 21 whereon the block 15 may rest. The optical surfaces 20, 21 are carefully formed to produce a sharp edge 24 where these surfaces meet. Furthermore, the top and bottom surfaces 22 and 23 are polished for good light transmission.

The surfaces 22 and 23 are formed respectively on a pair of plinth-like plano-parallel glass extensions 25 and 26 which are cemented respectively to the top and bottom polished faces of the block 15. Preferably, the glass extensions or plinths 25 and 26 are produced separately and are cemented in their respective places in such a position that the two short faces 27 and 28 are parallel to faces 20 and 21 and are recessed or set back therefrom as shown best in FIG. 3, whereupon the light entrance surfaces 29 and 30 are provided near the top of the block 15 and corresponding light exit surfaces 29' and 30' are provided near the bottom thereof in spaced relation to the mapping surface 16. The important advantage of such a construction is that two sharp edges 31 and 32 are formed in an exposed position at the upper and lower terminal portions of the optically flat surfaces 20, 21 so that there is no diffusion of light from these edges.

In operation, the projector light source 17 is energized and the clear glass block 15 is placed under the projector on the mapping surface 16. Any oblique fan of rays striking the vertical surfaces 20, 21 is reflected therefrom. The reflected rays add to the direct illumination of the mapping surface in the immediate vicinity outside of the block 15 and also reduce the general illumination inside of the block.

When the block is in such a position that a planar fan of rays F shown in FIG. 3 emanating from the lens 14 becomes coplanar with the optical surface 21, no internal or external reflection occurs and the balance of illumination of the mapping surface 16 underneath the glass block 15 as well as the immediate environment is undisturbed. As a consequence, a sharp dark line 33 appears which is the projection of the lower edge 32 of surface 21 upon the mapping surface, said line 33 marking a trace of the vertical ray fan F on said surface. Said dark line 33 may be marked on the mapping surface 16 with a pencil by use of a straight edge and may be extended somewhat beyond the proximity of the block 15, if desired.

Liksewise, when the alignment device 15 is moved along the aforementioned extended penciled line coinciding with line 33 so that the optical surface 20 becomes coplanar with a second vertical fan of light rays, the trace of said fan is projected upon the mapping surface 16 and appears as a dark line 34 which is the line of demarcation between internal and external illumination. A second penciled line may be drawn on the mapping surface 16 coincident with the dark line 34. The intersection point 35 of both penciled lines marks the nadir point of the projector.

Subject to the conditions that both optical surfaces 20 and 21 are simultaneously aligned with the respective aforementioned vertical ray fans, their two traces 33 and 34 meet at the trace 35 which is actually the trace of the sharp edge 24 where surfaces 20 and 21 meet each other. Such a trace 35 or intersection point marks the nadir point directly.

It is not necessary that the glass body 15 be formed exactly as shown since only one plinth 26 may be used in which case the glass body could not be used in an inverted position. Furthermore, the extensions 26 and 27 may actually be integrally formed by grinding and milling the glass block 15 in which case it is only necessary to carefully grind and polish the light entrant surfaces which are contiguous to the optical surfaces 20 and 21.

Although only one preferred form of the present invention has been shown and described in detail, still other forms are possible and changes may be made in the dimensions and proportions and the shapes of the contiguous parts without departing from the spirit of the invention.

I claim:

1. Optical means for indicating the position on a flat mapping surface of the nadir point which lies vertically directly beneath the locus of the perspective center of projection of an aerial photograph to be projected on said surface, said means comprising the combination of
    a clear glass block,
    a planar base surface formed on said block whereon it rests,
    at least one planar optical surface formed on said block precisely normal to said base surface so that it lies parallel to a pencil of light which connects said locus to said nadir point,
    a lateral polished flat light entrance surface formed on the block contiguously to the upper edge of said optical surface,
    a horizontal polished flat surface formed on the block so as to intersect said planar optical surface so as to form therewith a sharp edge which is spaced vertically from said base surface beneath said entrance surface and together with a contiguous vertical surface forms an undercut recess in the block, said horizontal surface serving as an exit surface for light rays which enter the block and illuminate the mapping surface lying thereunder, and
    a light source which is substantially a point of light or image of such source situated at said locus
    whereby portions of the cone of light rays which emanate from said source reflect from said optical surface to form on the mapping surface an intensified light area contiguously to a sharply defined darker area caused by the shadowing effect of said glass block, the border line between the light and dark areas being most distinct when said nadir point lies in the border line directly beneath said locus.

2. A nadir point indicating optical device for use in a photogrammetric projection plotter having a projection lens nodal point, said device comprising
    a clear glass block,
    a planar base surface formed on said block which rests on a mapping surface,
    at least one planar optical surface formed on the block precisely normal to said base surface,
    a lateral polished flat light entrance surface formed on said block contiguously to the upper edge of said optical surface,
    a second lateral polished flat surface formed on said block so as to intersect said optical surface at a sharp edge which is spaced vertically from said base surface and forms part of a recess underlying the optical surface, the second lateral surface serving to pass therethrough onto the underlying mapping surface the light rays which enter the first lateral surface,
    whereby portions of the cone of light rays which emanate from a point light source placed at the locus of said nodal point are reflected from said optical surface to form on the mapping surface an intensified light area contiguously to a sharply defined darker area caused by the shadowing effect of said glass block, the border line between the light and dark areas being most distinct when said nadir point lies in the border line directly beneath said nodal point.

3. A nadir point indicating optical device for use in a photogrammetric projection plotter having a projection lens nodal point, said device comprising
    an elongated clear glass block,
    a planar base surface formed on said block which rests on a mapping surface,
    at least two planar optical surfaces formed on adjacent sides of the block and meeting each other at a sharp corner which is coextensive with said surfaces,
    a lateral polished flat light entrance surface formed on said block contiguously to the upper edge of both of said surfaces,
    a second lateral polished flat surface formed on said block so that it meets each of said optical surfaces at a sharp edge and is substantially parallel to the light entrance surface, said second surface terminating inwardly in a vertical wall which is indented so as to cooperatively form a recess between said second surface and said base surface beneath the optical surfaces
    whereby portions of the cone of light rays which emanate from a point light source placed at the locus of said nodal point are reflected from both of said optical surfaces to form on the mapping surface a right-angle shaped intensified light area contiguously to a corresponding sharply defined darker area caused by the shadowing effect of said glass block, the angular border line between the light and dark areas forming a corner point which is most distinct when the nadir point, said nodal point and the corner point all lie in the same straight vertical line.

4. A nadir point indicating optical device according to claim 3 further characterized by
    said vertical surfaces being formed on a plane-parallel substantially square plinth which has said base surface formed thereon and is cemented to said second lateral surface.

References Cited
UNITED STATES PATENTS 2,792,747  5/1957  Mast _____ 88—24

NORTON ANSHER, *Primary Examiner.*

JOSEPH W. PRICE, *Assistant Examiner.*